United States Patent [19]

Duffy

[11] Patent Number: 4,609,331
[45] Date of Patent: Sep. 2, 1986

[54] SPEED SENSITIVE POWER STEERING VALVE

[75] Inventor: James J. Duffy, Livonia, Mich.

[73] Assignee: Ford Motor Company, Dearborn, Mich.

[21] Appl. No.: 657,559

[22] Filed: Oct. 4, 1984

Related U.S. Application Data

[63] Continuation-in-part of Ser. No. 386,850, Apr. 16, 1982.

[51] Int. Cl.[4] ............................ B62D 5/06; F04B 49/00
[52] U.S. Cl. ...................................... 417/293; 180/142; 180/143
[58] Field of Search ................. 417/293; 180/142, 143

[56] References Cited

U.S. PATENT DOCUMENTS

| 1,847,229 | 3/1932 | Swanson et al. | 417/293 |
| 3,314,495 | 4/1967 | Clark et al. | 180/79.2 |
| 3,690,400 | 9/1972 | Uchiyama et al. | 180/79.2 |
| 3,692,137 | 9/1972 | Inoue | 180/79.2 |
| 4,085,657 | 4/1978 | Keruagoret | 91/380 |
| 4,199,304 | 4/1980 | Strikis et al. | 417/310 |
| 4,244,389 | 1/1981 | Shimoura et al. | 137/117 |

FOREIGN PATENT DOCUMENTS 54-53427  4/1979  Japan .................... 180/142

Primary Examiner—Richard E. Gluck
Attorney, Agent, or Firm—Donald J. Harrington; Keith L. Zerschling

[57] ABSTRACT

A positive displacement pump for a vehicle power steering system comprising a rotor (42) rotatable in and cooperating with a stator (20) to define a pump cavity (52), (54), inlet and outlet ports (56), (58) and (34), (36) communicating with the pump cavity and a flow control valve (96) located in the flow delivery circuit wherein provision is made for opening the flow delivery circuit to a bypass circuit (72) upon an increase in the speed of the vehicle beyond a design point thereby reducing the pump back pressure and power usage which results in increased "road feel" at increased speeds while maintaining normal power assist during steering maneuvers at low speeds.

2 Claims, 9 Drawing Figures

SPEED SENSITIVE POWER STEERING VALVE

RELATED DISCLOSURE

This is a continuation-in-part of my copending U.S. patent application Ser. No. 386,850, filed Apr. 16, 1982, which is titled "Speed Sensitive Power Steering Pump Unload Valve".

TECHNICAL FIELD

My invention comprises improvements in a positive displacement power steering pump of the kind shown in U.S. Pat. No. 4,199,304, which issued on Apr. 22, 1980, to the assignee of my invention. Such pumps are used in power steering systems for motor vehicles.

BACKGROUND ART

I am aware of prior art patents that describe flow control valves for pumps that are speed sensitive, one being U.S. Pat. No. 4,244,389. That patent comprises a flow control valve having a variable orifice, the effective area of the orifice depending upon the position of the spool valve as seen in FIGS. 1 and 2 of the drawings for that patent. The valve moves, however, in accordance with pump speed or engine speed to vary the flow of fluid to the steering gear. The valve has no road speed sensitive function for eliminating the power assist at a selected design speed as in the valve of the present disclosure.

U.S. Pat. No. 3,314,495 shows a well-known flow control valve having a so-called drooper pin, best seen in FIG. 6 of that patent. The drooper pin is located in a flow control orifice that communicates with the fluid supply passage for a power steering gear. As the valve spool moves, the metering pin also moves; and its tapered area registers with the orifice to provide a variable effective orifice restriction. As the pump speed changes, the pressure of the fluid in the spring chamber for spring 34C for the construction of FIG. 6 of that patent is reduced by the venturi effect of the increased flow upon an increase in pump speed.

Power steering gear valves, as distinct from power steering pump valves, are shown in U.S. Pat. Nos. 3,690,400 and 3,692,137. These control the magnitude of the pressure in a reaction chamber for a power steering gear. They sense a speed signal, but they are effective only to influence the magnitude of the torque reaction during steering maneuvers and are not effective to reduce pump horsepower loss of the associated power steering pump and to eliminate the power assist at high speeds.

Another power steering system valve shown in U.S. Pat. No. 4,085,657 comprises a differential pressure operated valve that acts in a power steering gear fluid circuit to alter the fluid flow to the steering gear thus changing as desired the characteristic relationship of pressure to steering effort.

DISCLOSURE OF THE INVENTION

The power steering pump shown in U.S. Pat. No. 4,199,304 comprises a rotor assembly having multiple slipper pump elements that register with cam surfaces formed in a cam ring secured to the pump housing. The rotor is drivably connected to an engine driven pump drive shaft.

The cam ring cooperates with the rotor to define two crescent pump cavities spaced in 180° relative angular disposition. An inlet port and an outlet port are provided for each cavity so that two pumping strokes occur for each revolution of the rotor. The outlet ports supply a common flow control valve which maintains a constant flow in a flow delivery passage that communicates with a power steering fluid motor. The flow control valve comprises a valve spool that controls the degree of communication between each fluid outlet port and a bypass flow passage communicating with the inlet side of the pump.

In the particular embodiment described in this specification, the valve is located in a pump valve plate in which the valve porting is formed. The valve plate is situated against an end plate that registers with one side of the rotor and the side of the cam ring. The opposite side of the rotor and cam ring is engaged by a second end plate. Fluid pressure and spring force urge the end plates, the cam ring and the valve plate into stacked registry.

The valve spool is subjected to a calibrated spring force and to the pressure developed at the outlet ports. It is subjected also to a venturi pressure force that is developed by a flow venturi located in the flow distribution passage. The pressure at the throat of the venturi acts on the side of the pump engaged by the valve spring while the upstream side of the venturi corresponds to the pressure developed at the valve outlet ports.

The valve assembly includes also a vehicle speed sensing pressure relief valve that exhausts the side of the valve on which the valve spring acts. When the valve is closed, the spool valve acts in the usual way to control the pump flow throughout the rotor speed range. At a speed above a preselected value, such as 15 miles per hour, the speed sensitive valve exhausts the spring chamber of the flow control valve thereby reducing pump pressure and reducing the parasitic pump horsepower loss at high road speeds and eliminating power assist while increasing vehicle steering road "feel".

In a working embodiment of my invention the speed sensitive valve comprises a check valve located in the valve housing that contains the flow control valve and a solenoid actuator for opening the check valve against the opposing force of the check valve spring when the vehicle speed exceeds approximately 15 miles per hour. The solenoid in this working embodiment is secured to the fluid reservoir for the pump and the armature for the solenoid acts directly on the check valve element within the valve body for the flow control valve. No additional space is required to accommodate the pump, and the function of the speed sensitive valve can be introduced into the pump without adding appreciable cost or complexity to the pump design.

PARTICULAR DESCRIPTION OF THE INVENTION

Figure 1:
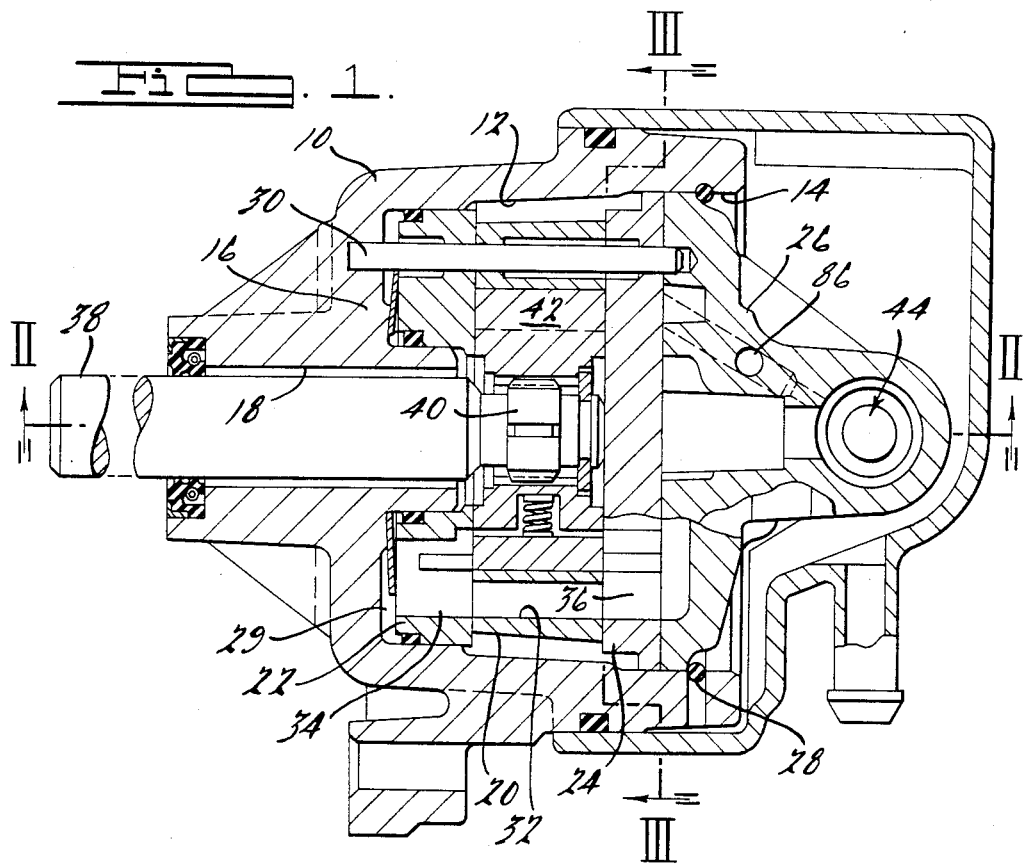
FIG. 1 shows in logitudinal cross section a prior art power steering pump capable of embodying the improvements of my invention.

In FIG. 1 a power steering pump housing 10 is provided with a cavity 12 having an end opening 14 and a closed end 16. A drive shaft opening is formed in the end 16 as shown at 18.

A pump cam ring 20 is located in the opening 12. A first end plate 22 is situated between the cam ring 20 and the housing end 16. The opposite side of the cam ring 20 is engaged by end plate 24. A closure plate 26 is positioned in the open end 14 adjacent the end plate 24 and is held in place by snap ring 28. Locator pins 30 extend through the cam ring and through the end plate to maintain proper angular registry between them.

A pressure chamber 29 is defined by the pump housing and by end plate 22. It communicates with the high pressure side of the pump through internal passages in the cam ring and the side plates as seen at 32, 34 and 36. The internal passages communicate with the outlet port for the pump.

The main drive shaft 38 extends through the opening 18. It includes a drive spline portion 40 which drivably engages an internally splined opening in the rotor 42.

The end plate 26 serves as a valve body for a flow control valve assembly indicated generally by reference character 44.

Figure 3:
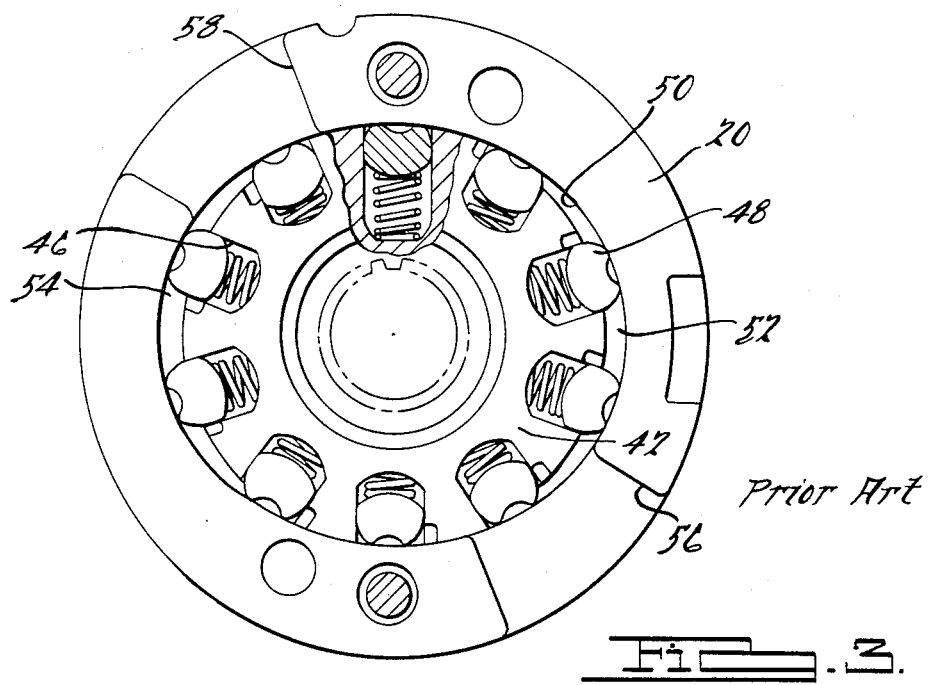
FIG. 3 is a cross-sectional view showing the cam and rotor assembly for the construction of FIG. 1 as seen from the plane of section line 3—3 of FIG. 1.

As seen in FIG. 3, the rotor 20 comprises a plurality of angularly spaced recesses 46, each of which receives a slipper pumping element 48. The slipper elements 48 engage internal cam surface 50 of the cam ring 20. The cam surface 50 is oblong, as seen in FIG. 3, with its major axis shown horizontal in FIG. 3 and the minor axis shown vertical. An inlet port and an outlet port communicate with the pumping space 52, and a second inlet port and a second outlet port communicate with pumping space 54. The inlet ports are shown in FIG. 3 at 56 and 58, respectively. The outlet ports are formed by the side plates 22 and 24.

Figure 2:
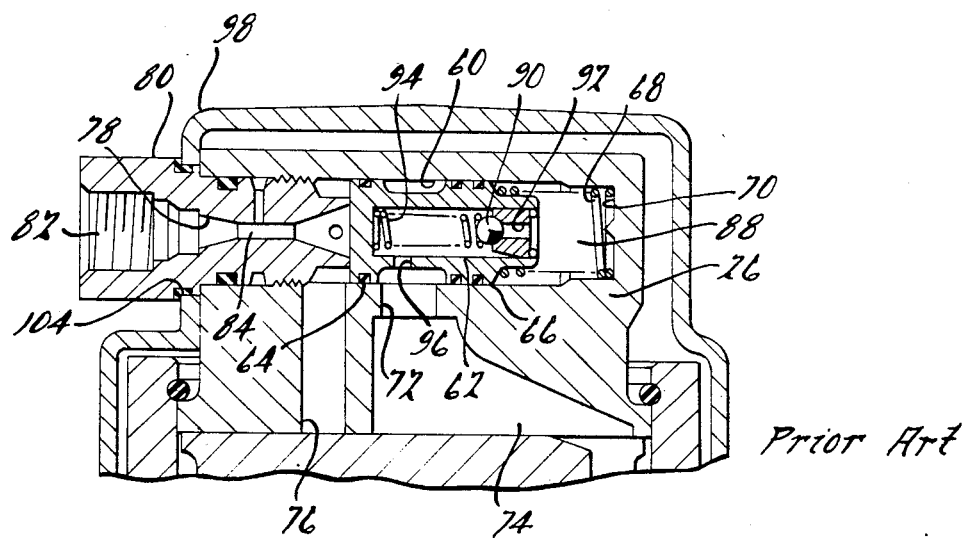
FIG. 2 is a cross-sectional view of the valve body of the construction of FIG. 1 as seen from the plane of section line 2—2 of FIG. 1.

I have shown the flow control valve more particularly in FIG. 2. It includes a valve bore 60 formed in end plate 26. A valve spool 62 having two spaced lands 64 and 66 is positioned slidably in the valve bore 60. The valve spool 62 is urged in a left-hand direction by valve spring 68 seated at the end 70 of the valve bore. A bypass port 72 communicates with the valve bore 60 and the inlet port 74. A high pressure passage 76 extends from the high pressure outlet ports of the pump to the left-hand side of the valve bore 60 so that the outlet pressure of the pump acts on the left-hand surface of valve land 64.

Spring 68 normally tends to decrease the degree of communication between high pressure passage 76 and the bypass port 72. The left-hand side of the valve chamber 60 communicates with the right-hand side or the inlet side of a flow venturi 78 formed in fluid fitting 80 which is threadably received in the left-hand end of the valve bore 60. The outlet side of the venturi passage 78 is connected to the flow delivery passage of a power steering system, which is connected to the fitting by a threaded connection 82.

The throat of the venturi passage 84 communicates with a cross-over passage as shown in FIG. 1 at 86. This passage extends to the right-hand end of the valve body occupied by the spring 68. That spring chamber is identified in FIG. 2 by reference numeral 88. A pressure relief valve, which normally is closed except under extreme pressure conditions, is shown at 90 in the interior of the valve spool which communicates with inlet port 74. Valve 90 is urged by spring 94 into registry with orifice 92.

The construction described with reference to FIGS. 1, 2 and 3 is typical of prior art constructions as shown in U.S. Pat. Nos. 4,199,304 and 4,298,316, which are assigned to the assignee of this invention.

Figure 4:
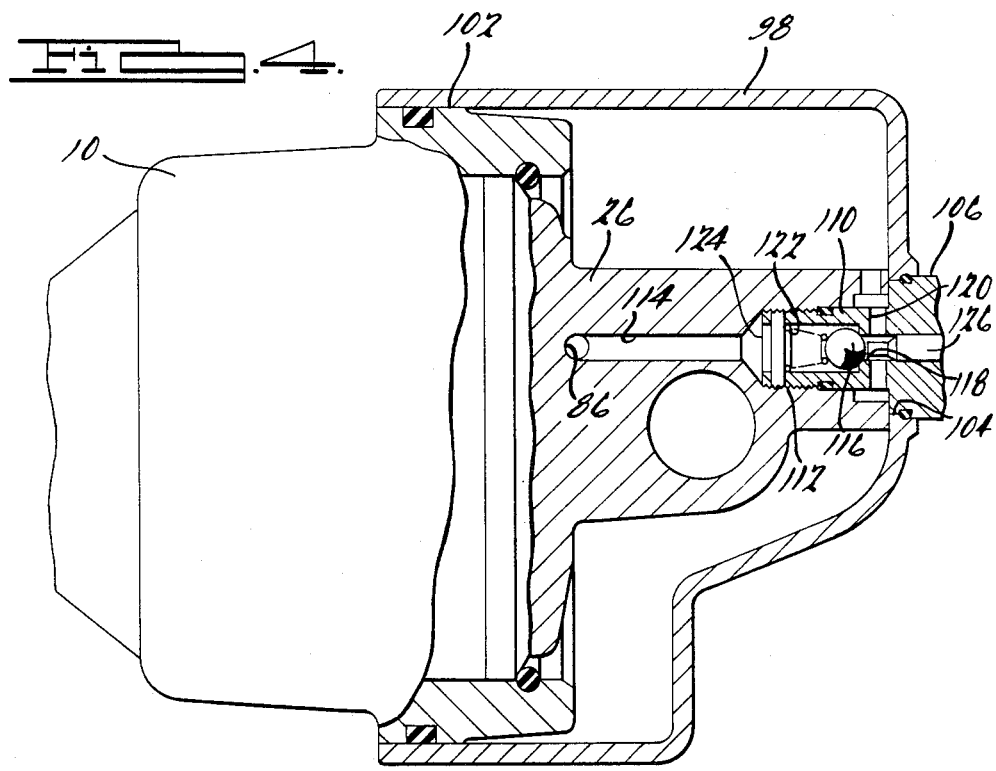
FIG. 4 is a view showing in partial outline the pump construction of FIG. 1 with a part of my improved valve shown in cross section.
Figure 5:
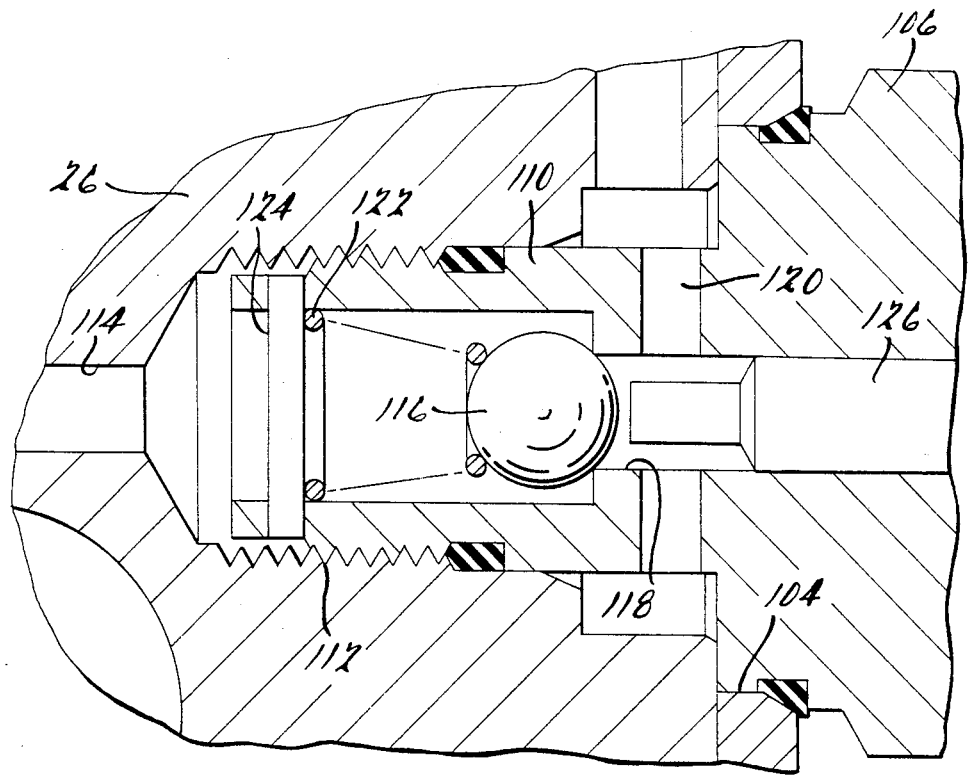
FIG. 5 is an enlarged view of the relief valve and solenoid actuator shown in the assembly of FIG. 4.

In FIG. 5 I have shown a cross-sectional view of the end plate 26 as seen in FIG. 4. The end plate 26 is enclosed by a reservoir cover 98. This is seen also in the cross-sectional view of FIG. 2. One side of the reservoir cover 98 is open and surrounds the periphery 102 of the pump housing 10. The venturi element 80 is received through an opening 104 in one side of the reservoir cover 98. The rear of the reservoir cover 98 has a second opening 104 which receives therein a mounting stem 106 of a solenoid operated valve designated generally in FIG. 6 by reference numeral 108. Connected to the stem 106 is an externally threaded valve housing 110 which is threadably received in an internally threaded opening 112 in the housing 26. The inboard end of the opening 112 communicates through passage 114 with the cross-over venturi throat pressure passage 86.

A check valve element 116 located in the opening 112 is urged against a valve seat surrounding orifice 118, the latter communicating through radial passages 120 with the interior of the reservoir cover 98. Spring 122 urges the ball to a seated position and spring 122 is seated on a retainer pin 124 located in the opening 112.

A solenoid core extension 126 extends through the orifice 118 and is adapted to move the valve element 116 off its seat when it is urged in a left-hand direction. A valve unseating force is imparted to the extension 126 by a solenoid operator indicated in FIG. 6 at 108. The solenoid operator 108 comprises a solenoid winding 128 in an armature 130, the latter being connected to the extension 126.

Figure 6:
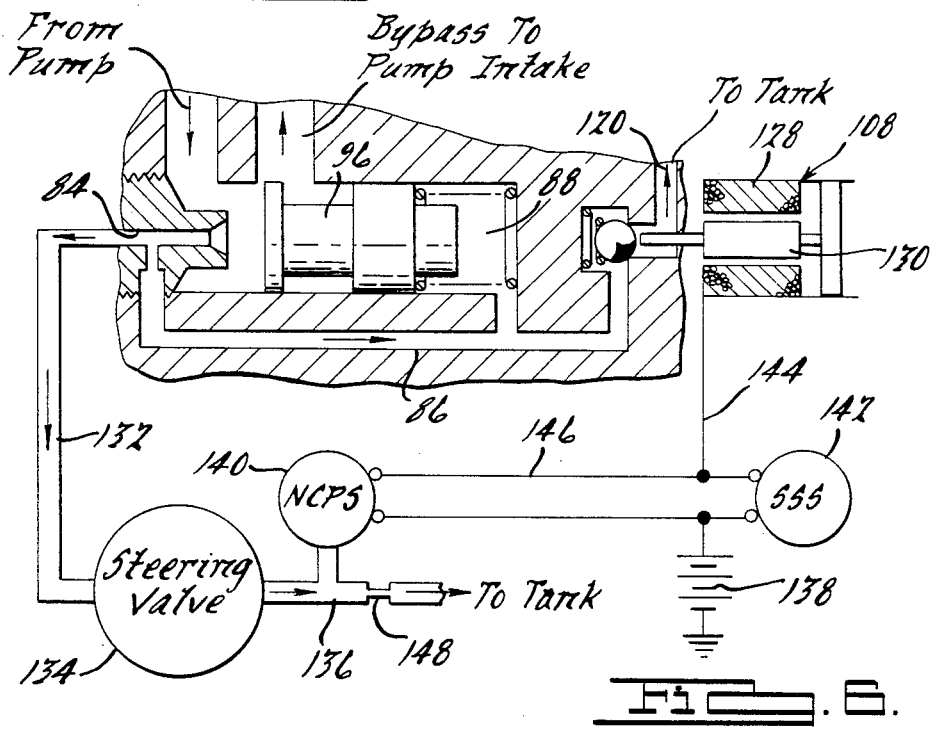
FIG. 6 is a schematic diagram of my improved power steering system flow control valve and solenoid operated vehicle speed sensitive valve.

As seen in FIG. 6 the delivery passage 132 is connected to the venturi element 80. It extends to the power steering valve 134. The fluid circulated through the valve supplies a steering gear mechanism of the type described, for example, in U.S. Pat. No. 4,085,657 and is returned to the tank or reservoir through passage 136.

The electrical circuit for the solenoid 108 comprises a voltage source 138, a normally closed pressure switch 140 and a speed sensitive switch 142. The positive side of the voltage source 138 is connected to the solenoid winding 128 through electrical lead 144. A parallel lead 146 completes a circuit between the ground side of the voltage source 138 and the solenoid whenever pressure switch 140 is closed. It is closed during a turning maneuver of the vehicle so that the solenoid remains energized when the steering valve is closed and there is no pressure at the switch. If the steering valve is closed during power steering, the switch 140 closes and the solenoid cannot overcome pressure on the ball. Pressure on the ball also prevents a shift from power assist to manual steering during a steering maneuver.

Switch 142 bypasses the switch 140. At speeds above a preselected value, such as 10 to 15 miles per hour, the switch 142 is closed and the solenoid is energized thus venting the valve spring chamber 88. The valve spool 96 then becomes a simple pressure relief valve and maintains a constant low pressure on the discharge side of the pump. At speeds below the critical value of 10 or 15 miles per hour, switch 142 is opened so the solenoid is deenergized. The valve spool 96 then functions in the usual fashion as it responds to the pressure differential created by the venturi pressure in the throat 84 of the venturi.

A shift from manual steering to power steering during a steering maneuver is prevented by the switch 140 which is installed in the power steering valve return passage 136 on the upstream side of orifice 148. During straight ahead driving, steering valve 134 is opened; and pressure at the switch keeps it open thus permitting the speed sensor switch 142 to deenergize the solenod when the speed decreases to a value below the predetermined value, thus restoring full power assist.

Figure 8:
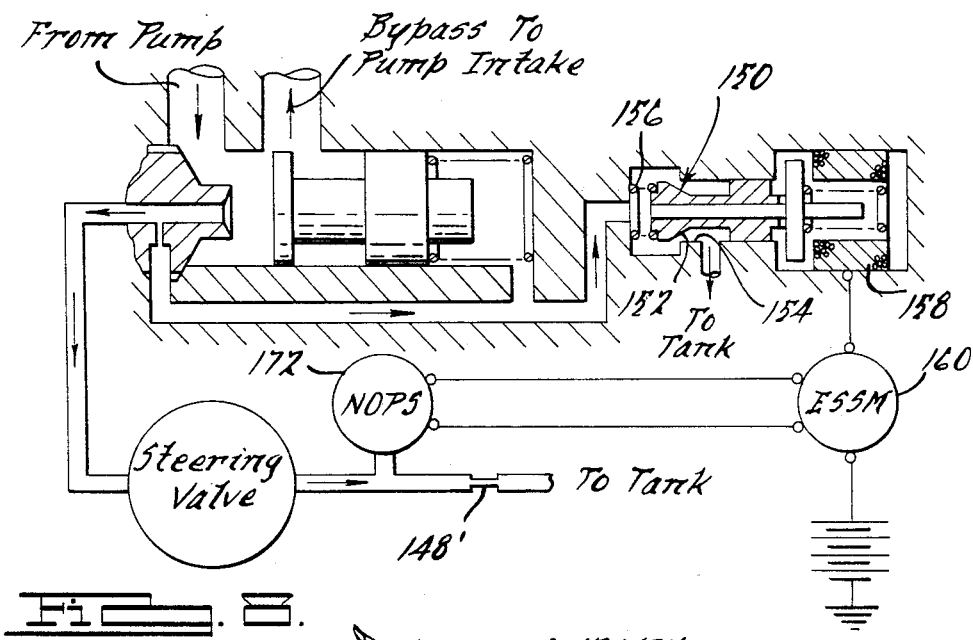
FIG. 8 is a steering valve circuit diagram including a solenoid operated variable orifice.

In FIG. 8 I have shown an embodiment of the invention that has a variable flow orifice valve 150 rather than a ball valve element 116. Valve 150 has a tapered land 152 which registers with orifice 154. The valve 150 is urged toward engagement with orifice 154 by spring 156. As the valve 150 is adjusted, the size of orifice 154 is varied. The valve 150 is adjusted by normally open valve solenoid 158 which is under the control of an electronic vehicle speed sensor module 160, which includes a speed sensor switch.

Figure 9:
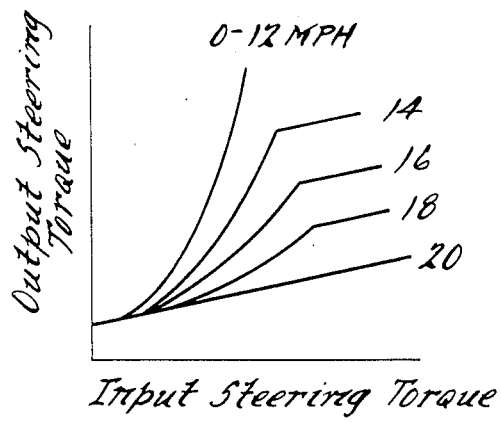
FIG. 9 is a chart showing the torque characteristics of a steering gear mechanism using the valve designs of FIGS. 7 or 8.

A plurality of steering torque vs. input torque curves may be obtained using the variable orifice arrangement of FIG. 8. Typical characteristic curves are shown in FIG. 9. This is in contrast to the FIG. 6 construction where the change in operating mode from power assist to manual steering is represented by a single curve. The speed range for each curve shown in FIG. 9 is labeled.

Figure 7:
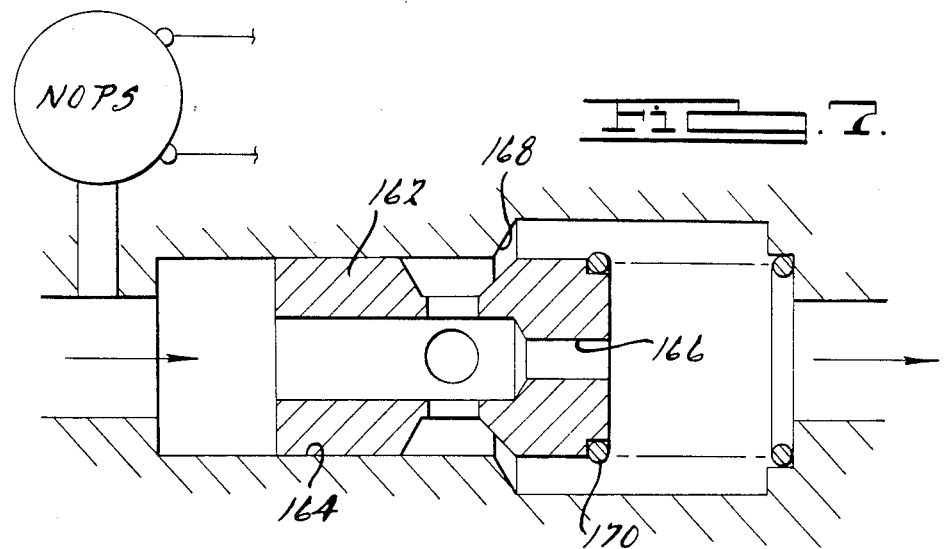
FIG. 7 is a cross-sectional view of a valve element adapted for variable flow.

FIG. 7 shows a modified valve that may replace the orifice 148′ of FIG. 8. It includes a spool valve element 162 disposed for axial adjustment in bore 164. It has a fixed orifice 166 in valve spool 162 and a varible orifice 168. Spring 170 urges the spool 162 toward a closed position. The normally open pressure switch (NOPS) 172 is pressurized by the pressure on the upstream side of orifice 166. Orifice 166 is bypassed by the added pressure relief valve 164 and 168 which limits the pressure to a valve slightly above the NOPS operating pressure. The relief valve prevents an excessive pressure rise which would occur during straight-ahead driving when power steering and full flow are restored.

Using the FIG. 8 construction parasitic losses are reduced and increased road steering "feel" occur when the speed exceeds a predetermined speed. Also a shift from manual to power assist, or vice versa, is prevented during a steering maneuver.

When the solenoid of FIG. 8 is energized below a predetermined vehicle speed—10 mph, for example—the flow control spring chamber is vented. The flow control valve then becomes a simple relief valve maintaining a constant low pressure on the pump discharge.

To prevent a shift from manual steering to power steering during a steering maneuver, normally open pressure switch (NOPS) 172 in the return line is located upstream of the orifice 148′ or the orifice valve of FIG. 7. During straight-ahead driving at low speed the steering valve is open and the pressure at the switch keeps it closed, permitting the speed sensor switch in the speed sensor module 160 to energize the solenoid, restoring power assist. During a turn, however, the switch 172 keeps the solenoid deenergized since the steering valve is closed; and there is no pressure at the switch. If the steering valve is closed during power steering, switch 172 may open; but the solenoid spring cannot overcome pressure on the valve 150. Pressure on valve 150 also prevents a shift from power assist to manual steering during a steering maneuver.

The solenoid valve is open in the event of an electrical failure to avoid a steering system pressure rise.

Having described a preferred embodiment of my invention, what I claim can desire to secure by U.S. Letters Patent is:

1. A power steering pump for use in a power steering system for a vehicle having fluid pressure controlling steering valve comprising:

a pressure regulating flow control valve for the power steering pump;

said pump having a high pressure flow delivery passage and a low pressure return passage;

said pressure regulating flow control valve being situated in and partly defining said circuit for establishing controlled communication between said high pressure passage and said return passge and including a movable valve element;

one side of said valve element being subjected to static pressure in said flow delivery passage and movable in a first direction by said static pressure to increase the communication between said flow delivery passage and said return passage, means for urging said valve element in the opposite direction to decrease said communication, a venturi passage in said flow delivery passage having a venturi inlet and a throat downstream of the venturi inlet, a cross-over passage connecting the venturi throat with another side of said valve element whereby a speed proportional pressure acts on said valve element urging said valve element in said opposite direction;

vehicle speed sensitive valve means for exhausting the speed proportional pressure on said other side of said valve element at speeds greater than a predetermined value whereby the flow control valve acts solely as a pressure regulator bypass valve;

said speed sensitive valve means comprising a relief valve that is normally closed and that communicates with said cross-over passage, and a solenoid actuator comprising an armature adjacent said relief valve adapted to open the same when it is moved in one direction, and a solenoid winding circuit which, when energized, actuates said armature;

said solenoid actuator including a vehicle speed sensing module, a normally open pressure switch located on the downstream side of said steering valve, and a flow control orifice located downstream of said steering valve and said normally open pressure switch, said normally open pressure switch responding to a pressure increase upstream of said control orifice to open the solenoid winding circuit.

2. The combination as set forth in claim 1 wherein said flow control orifice comprises a movable valve spool with a fixed orifice thereon, said spool having a valve land thereon, a valve opening receiving said spool and defining a valve land that registers with said spool valve land to establish a variable size orifice acting in parallel flow relationship with respect to said fixed orifice, an increase in the pressure on the downstream side of said steering valve effecting an increase in the size of said variable size orifice.

* * * * *